(12) United States Patent
Pichumani et al.

(10) Patent No.: US 12,148,139 B2
(45) Date of Patent: Nov. 19, 2024

(54) METHODS AND EVALUATION DEVICES FOR ANALYZING THREE-DIMENSIONAL DATA SETS REPRESENTING DEVICES

(71) Applicant: Carl Zeiss SMT GmbH, Oberkochen (DE)

(72) Inventors: Ramani Pichumani, Palo Alto, CA (US); Thomas Korb, Schwaebisch Gmuend (DE); Dmitry Klochkov, Schwaebisch Gmuend (DE); Jens Timo Neumann, Aalen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 466 days.

(21) Appl. No.: 17/536,662

(22) Filed: Nov. 29, 2021

(65) Prior Publication Data
US 2023/0169636 A1    Jun. 1, 2023

(51) Int. Cl.
*G06T 7/00* (2017.01)
*G06N 20/20* (2019.01)
*G06T 7/11* (2017.01)

(52) U.S. Cl.
CPC .......... *G06T 7/0004* (2013.01); *G06N 20/20* (2019.01); *G06T 7/11* (2017.01); *G06T 2207/20081* (2013.01); *G06T 2207/30148* (2013.01)

(58) Field of Classification Search
CPC ..................... G06T 7/0004; G06T 7/11; G06T 2207/20081; G06T 2207/30148; G06T 7/001; G06T 2207/10028; G06T 2207/10061; G06T 2207/10081; G06T 2207/30172; G06N 20/20
USPC .................................. 382/154, 100, 141, 276
See application file for complete search history.

(56) References Cited

U.S. PATENT DOCUMENTS

| | | | |
|---|---|---|---|
| 9,996,890 B1* | 6/2018 | Cinnamon | G06V 10/764 |
| 11,188,800 B1* | 11/2021 | Douglas | G06V 10/22 |
| 11,216,932 B1* | 1/2022 | Checka | G06T 7/0002 |
| 2020/0105500 A1* | 4/2020 | Chou | H01J 37/261 |
| 2020/0234071 A1* | 7/2020 | Yuvaraj | G06V 10/25 |
| 2020/0271595 A1* | 8/2020 | Rosenberg | G06T 17/10 |
| 2020/0320682 A1* | 10/2020 | Alexander | G06F 18/2321 |
| 2020/0401854 A1* | 12/2020 | Peng | G06F 18/2155 |
| 2021/0209766 A1* | 7/2021 | Cho | G06T 7/11 |
| 2021/0319561 A1* | 10/2021 | Fang | G06T 7/11 |
| 2023/0169619 A1* | 6/2023 | Ahmed | G01N 23/10 |
| | | | 705/325 |

OTHER PUBLICATIONS

Chen et al., A Light-Weighted CNN Model for Wafer Structural Defect Detection, IEEE, vol. 8, 2020, pp. 24006-24018. (Year: 2020).*

Chang et al., Two-layer Competitive Hopfield Neural Network for Wafer Defect Detection, IEEE 2005, pp. 1058-1063. (Year: 2005).*

(Continued)

*Primary Examiner* — Kathleen Y Dulaney
(74) *Attorney, Agent, or Firm* — Fish & Richardson P.C.

(57) ABSTRACT

Methods and evaluation devices for evaluating 3D data of a device under inspection are provided. A first machine learning logic detects target objects, and a second machine learning logic provides a voxel segmentation for the target objects. Based on the segmented voxels, a transformation to feature space is performed to obtain measurement results.

20 Claims, 10 Drawing Sheets

(56) References Cited

OTHER PUBLICATIONS

The International Search Report and Written Opinion of the International Searching Authority for International Application No. PCT/EP2022-081351, dated Feb. 14, 2023.
"Feature (computer vision)", *Wikipedia,* (Oct. 7, 2013).
Gall et al., "Hough Forests for Object Detection, Tracking, and Action Recognition", *IEEE Transactions on Pattern Analysis and Machine Intelligence,* vol. 33, No. 11, pp. 2188-2202 (Nov. 2011).
Lopez de la Rosa et al., "A Review on Machine and Deep Learning for Semiconductor Defect Classification in Scanning Electron Microscope Images", *Applied Sciences,* vol. 11, No. 20 (Oct. 12, 2021).
Mu, "A Survey of Recommender System Based on Deep Learning", *IEEE Access,* vol. 6, pp. 69009-69022 (2018).
Neumann et al., "3D analysis of high-aspect ratio features in 3D-NAND", *Proceedings of SPIE,* vol. 11325, pp. 113250M-1-113250M-11 (Mar. 20, 2020).
Pahwa et al., "Machine-Learning Based Methodologies for 3D X-Ray Measurement, Characterization and Optimization for Buried Structures in Advanced IC Packages", ARXIV.org, Cornell University Library, Ithaca, NY (Mar. 8, 2021).
Vasquez et al., "Comparing Linear Feature Space Transformations for Correlated Features", *Perception in Multimodal Dialogue Systems,* [Lecture Notes in Computer Science], Springe-Verlag, Berlin, Heidelberg, pp. 176-187 (Jun. 16, 2008).
Aggarwal, Charu C., "An Introduction to Recommender Systems", *Recommender Systems,* Springer, Cham., (2016).
Bradski et al., "Chapter 6—Image Transforms", *Learning OpenCV,* O'Reilly Media, Inc., Sebastopol, CA, pp. 144-189 (2008).
Kaestner et al., "Novel Workflow for High-Resolution Imaging of Structures in Advanced 3D and Fan-Out Packages," *2019 China Semiconductor Technology International Conference (CSTIC),* pp. 1-3 (2019).
Kanyiri et al., "Analysis of flow parameters of a Newtonian fluid through a cylindrical collapsible tube", *Springer Plus,* vol. 3, No. 566 (2014).
Li et al., "Root Cause Investigation of Lead-Free Solder Joint Interfacial Failures After Multiple Reflows", *Journal of Electronic Materials,* vol. 46, No. 3, pp. 1674-1682 (2017).
Mahmoudi et al., "Bio-CAD modeling of femoral bones with Dual X-ray absorptiometry and Spiral CT-scan technique", *The 26$^{th}$ Annual International Conference of Iranian Society of Mechanical Engineers—ISME2018,* Apr. 24-26, 2018, School of Mechanical Engineering, Semnan University, Semnan, Iran (2018).
Schmidt et al., "Novel sample preparation and high-resolution X-ray tomography for Package FA", *24$^{th}$ International Symposium on the Physical and Failure Analysis of Integrated Circuits (IPFA 2017),* pp. 1-4 (2017).
Schmidt, "X-ray Imaging Tools for Electronic Device Failure Analysis", *Microelectronics Failure Analysis Desk Reference,* Seventh Edition, pp. 62-66 (2019).

* cited by examiner

METHODS AND EVALUATION DEVICES FOR ANALYZING THREE-DIMENSIONAL DATA SETS REPRESENTING DEVICES

TECHNICAL FIELD

The present application relates to methods and devices for analyzing three-dimensional (3D) data sets representing a device under inspection, in particular target objects like three-dimensional structures as found in semiconductor devices. Such methods and devices can for example be used to detect anomalies, faults or the like in the target objects or for measuring the target objects.

BACKGROUND

In the manufacture of semiconductor devices, manufactured devices are monitored during or after production or also as test samples when setting up a production line. With increasing miniaturization, such semiconductor devices include more and more tightly packed structures, which presents a challenge for evaluation. For example, nowadays complex semiconductor devices may include two or more chip dies stacked one on the other, with a high number of metal interconnects embedded in insulating materials (dielectric material or also air or another gas) provided for electrical connections. Faults in these interconnects may adversely affect the functioning of the device, sometimes only after longer use and therefore not immediately apparent by performing an electrical function test. Such structures like interconnects which are embedded in another material are also referred to as embedded 3D structures herein.

Various techniques exist for obtaining 3D data sets for such embedded structure, including optical methods, X-ray methods, scanning electron microscopy (SEM)-based methods and computer tomography (CT) microscopy, some of which involve destroying the device (for example by removing layer by layer from the device and obtaining a 2D image from each layer before it is removed), and some being non-destructive like CT microscopy.

For structures found in semiconductor devices, which have small dimensions and may for example include a high number of structures like interconnects between chip dies, the amount of 3D data resulting is large. Therefore, efficient methods for analyzing this data are needed.

While classical computer vision techniques and machine learning techniques have been applied to this problem, current solutions suffer from various drawbacks like the need for defining measurement templates that are manually or automatically fit to a device data, the need for specific measurement recipes that provide procedural instructions for searching and detection of structural features such as edges and corners, manual data registration and limited generalizability. These drawbacks can become more severe as the number of structures in a device under inspection increases, or more structural and topographical variations are encountered.

SUMMARY

Methods and devices as defined in the independent claims are provided. The dependent claims define further embodiments.

According to an embodiment, a method for evaluating 3D data of a device under inspection, comprising:
  detecting target objects in the 3D data using a first machine learning logic,
  applying a voxel classification to the detected target objects using a second machine learning logic to provide a segmentation of voxels depending on a material of the device the respective voxel represents,
  applying a transformation to feature space to the classified voxels, and
  obtaining measurement results based on the transformation to feature space.

Through the combination of the first and second machine learning logic with a transformation, efficient processing of the 3D data can be achieved.

The term target object relates to any three-dimensional (3D) structure of the device. Such 3D structures may be repetitive, meaning that within a device a plurality of similar structures are provided.

The term machine learning logic refers to an entity that can be trained by training data to be able to perform certain tasks, in the context of the present application segmentation tasks as will be explained further below. A machine learning logic can for example be based on neural networks like deep neural networks, general adversarial networks, convolution neural networks or support vector machine, but can also include approaches like random forest models like random hough forest models or 3D random forest models or decision trees. Machine learning logics are implemented on electrical devices like computers. All references to such electrical devices and the functionality provided by each are not intended to be limited to encompassing only what is illustrated and described herein. While particular labels may be assigned to such electrical devices disclose, such levels are not intended to limit the scope of operation for the electrical devices. Such electrical devices can be combined with each other and/or separated in any manner based on the particular type of electrical implementation that is desired. For example, various functions can be performed in different devices connected via a network. It is recognized that electrical devices disclosed herein that are usable for implementing techniques discussed herein can include any number of microcontrollers, machine learning specific hardware, for example a graphics processor unit (GPU), and/or a tensor processing (TPU), integrated circuits, memory devices (for example flash, random access memory, read-only memory, electrically programmable read-only memory, electrically erasable programmable read only memory or other suitable variance thereof), and software which co-act with one another to perform operation(s) disclosed herein. In addition, any one or more of the electrical devices can be configured to execute a program code that is embodied in a non-transitory computer readable medium, a data carrier signal or the like program to perform any number of the functions as discussed herein.

The term voxel is derived from the words volume and elements and in computer graphics represents a value on a regular grid in three-dimensional space, for example a color value like RGB value, grayscale value, intensity value or the like.

The term feature space generally relates to features that are used to characterize the 3D data.

The device may be a semiconductor device. Semiconductor devices include one or more semiconductor chip dies, and may also include further components like interconnects between chip dies in case a plurality of chip dies are provided, interconnects like bond wires to external terminals of the semiconductor device, for example pins of a package, the package itself, etc.

In this case, the target objects may be interconnects between chip dies.

The first machine learning logic can comprises a hough forest model. The second machine learning logic can comprise a 3D random forest segmentation model. However, other types of machine learning logic can also be used.

The transformation to feature space can include a transformation to linear feature space.

The transformation to feature space can comprise providing one or more functions describing a dependency of a first dimensional variable to a second dimensional variable, or derivatives thereof. A dimensional variable is to be understood as a variable describing dimensions like height, diameter, area or volume of the target objects.

The first dimensional variable can include an area or a diameter, and the second dimensional variable can include a position variable like position in length or depth direction, such that, e.g., area or diameter can be given as a function of depth or length position.

Obtaining measurements can include identifying deviations of the functions from nominal functions, i.e. functions expected if the target objects are essentially as designed, within acceptable tolerances.

The one or more functions are user configurable. This in some embodiments can allow flexibility regarding the measurements.

In some embodiments, a predictive model can be used to predict a desired configuration of a user. In this way, the number of manual configurations a user needs to make can be reduced.

A corresponding evaluation device for evaluating 3D data of a device under inspection is also provided, comprising one or more processors configured to:
- detect target objects in the 3D data using a first machine learning logic,
- apply a voxel classification to the detected target objects using a second machine learning logic to provide a segmentation of voxels depending on material of the device the respective voxel represents,
- apply a transformation to feature space to the classified voxels, and
- obtain measurement results based on the transformation to feature space.

The evaluation device can be configured to execute any of the methods above.

A system, comprising a measurement device configured to obtain 3D data of a device under test, and the above evaluation device is also provided.

Furthermore, a method for training the evaluation device is provided, comprising:
- training the first machine learning logic based on training data with annotated target objects, and
- training the second machine learning logic with training data including annotated voxels.

Corresponding computer programs and tangible storage media storing the computer program (e.g., CD, DVD, flash memory, read only memory, etc.) are also provided.

DETAILED DESCRIPTION

In the following, various embodiments will be discussed in detail referring to the attached drawings. It is to be understood that these embodiments serve as example only and are not to be construed as limiting. For example, while embodiments may be described including a plurality of features (elements, components, acts, events, method steps and the like), in other embodiments some of these features can be omitted and/or can be replaced by alternative features. In addition to the features explicitly shown and described, in other embodiments additional features, for example features conventionally used for analyzing three-dimensional structures in devices and systems like semiconductor devices, can be provided.

Features from different embodiments can be combined unless noted otherwise. Modifications and variations described with respect to one of the embodiments shown and described can also be applied to other embodiments and will therefore not be described repeatedly.

Semiconductor devices, in particular interconnects between chip dies, will be used as example for 3D structures as target objects herein. It is to be understood that techniques discussed herein can also be applied to other 3D structures, in particular embedded 3D structures.

Figure 1:
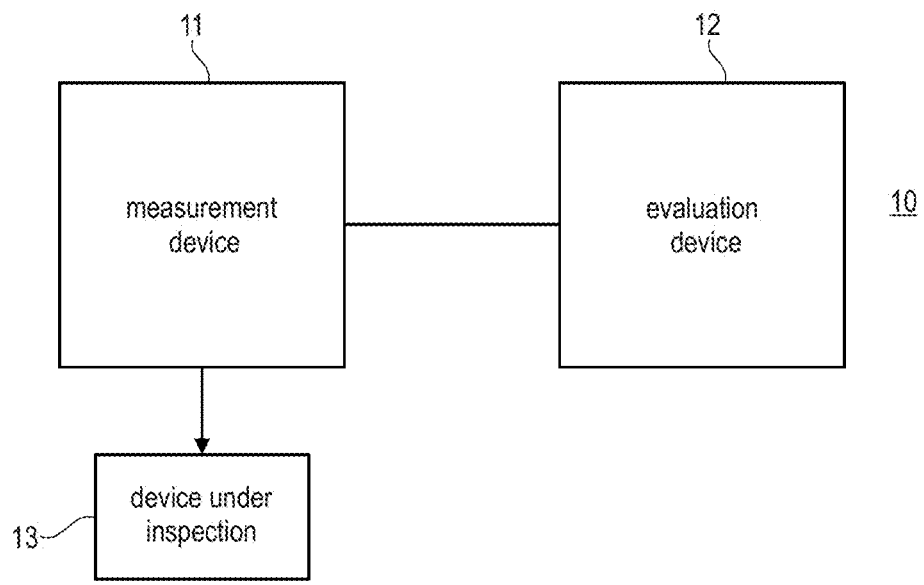
FIG. 1 is a block diagram illustrating a system according to an embodiment.

Turning now to the Figures, FIG. 1 is a block diagram of a system 10 according to an embodiment, including an evaluation device 12 according to an embodiment.

System 10 includes a measurement device 11 configured to obtain three-dimensional data from a device under inspection 13. Device under inspection 13 may for example be a semiconductor device, for example a semiconductor device including a plurality of chips stacked on each other and interconnects between the chips. Measurement device 11 can be any measurement device conventionally used to obtain 3D data from device 13 in a destructive or nondestructive manner. For example, measurement device 11 can be based on optical approaches, x-ray approaches or scanning electron microscopy or computer tomography (CT) microscopy. As an example for a destructive approach, device under inspection 13 may be removed layer by layer, and for each layer a scanning electron microscopy image can be obtained, such that all images together form a 3D representation of device under inspection 13. As an example for a nondestructive method, computer tomography microscopy can be used. Such techniques for obtaining three-dimensional data are for example further described in M. Kaestner, S. Mueller, T. Gregorich, C. Hartfield, C. Nolen and I. Schulmeyer, "Novel Workflow for High-Resolution Imaging of Structures in Advanced 3D and Fan-Out Packages," 2019 China Semiconductor Technology International Conference (CSTIC), 2019, pp. 1-3, doi: 10.1109/CSTIC.2019.8755668, in Li, Y., Hatch, O., Liu, P. et al. Root Cause Investigation of Lead-Free Solder Joint Interfacial Failures After Multiple Reflows, Journal of Electronic Materials 46, 1674-1682 (2017). https://doi.org/10.1007/s11664-016-5211-0, in C. Schmidt, S. T. Kelly, Y. Wang, S. T. Coyle and M. H. Shearer, "Novel sample preparation and high-resolution X-ray tomography for package FA," 2017 IEEE 24th International Symposium on the Physical and Failure Analysis of Integrated Circuits (IPFA), 2017, pp. 1-4, doi: 10.1109/IPFA.2017.8060174 or in C. Schmidt, "X-ray Imaging Tools for Electronic Device Failure Analysis," Microelectronics Failure Analysis Desk Reference, Seventh Edition, 2019, pp. 62-66.

The thus obtained 3D data of device under inspection 13 is then provided to evaluation device 12 for evaluation. It should be noted that evaluation device 12 can be located remote from measurement device 11, and the 3D data can be transferred to evaluation device 12 over a network like a local area network (LAN), wireless network, for example WLAN, or over the internet.

Evaluation device 12 can be a computing device like a computer, microcontroller or other programmable processing device programmed to perform the analysis discussed herein below referring to FIGS. 2 to 10. Evaluation device 12 can include one or more processors. In some instances, evaluation device 12 need not be provided as a single unitary device, but can also be provided as a plurality of devices connected via a network, such that different stages of the analysis described below can be performed in different devices. Generally, as will be described in more detail, evaluation device 12 utilizes a two-step machine learning approach to classify voxels of the 3D data, and then use transformations on the classified voxel to a feature space. In other embodiments, evaluation device 12 can be fully or partially implemented using dedicated hardware, like application-specific integrated circuits (ASICs), to implement techniques as discussed herein.

Figure 2:
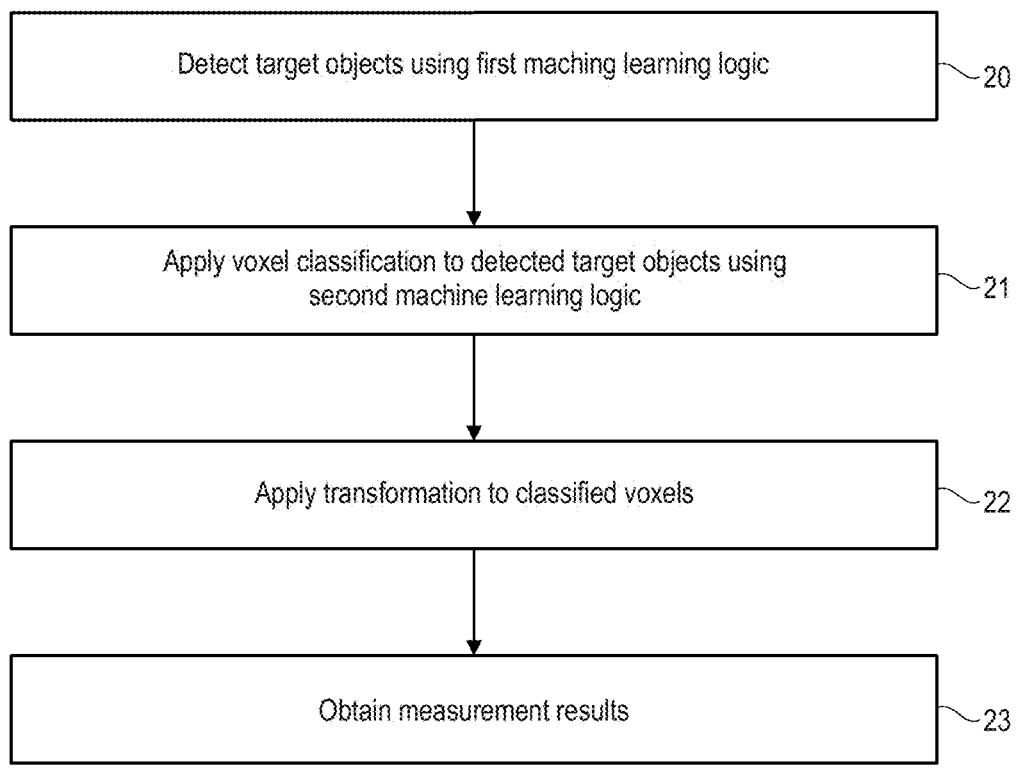
FIG. 2 is a flowchart illustrating a method according to an embodiment.

FIG. 2 is a flowchart illustrating a method according to an embodiment. The method of FIG. 2 can be implemented in evaluation device 12 of FIG. 1, for example using one or more corresponding computer programs to program a microprocessor, central processing unit, graphics processing unit or other suitable processor accordingly.

At 20, the method of FIG. 2 comprises detecting target objects using a first machine learning logic. The term "target objects" relate to objects, in the present case three-dimensional objects or structures, which are to be evaluated by evaluation device 12. For example, in case of a semiconductor device, the target objects can be interconnects between chips, structures in or on chips, connections from chips to pins of a package, etc.

At 21, the method includes applying a voxel classification to the detected target objects using a second machine learning logic. Voxel classification means that the voxels of the detected target objects are classified for example based on different materials the respective voxel represents. For example, in case of interconnects, different materials may include solder material, copper leads, tungsten, surrounding dielectric material, etc.

Figure 3:
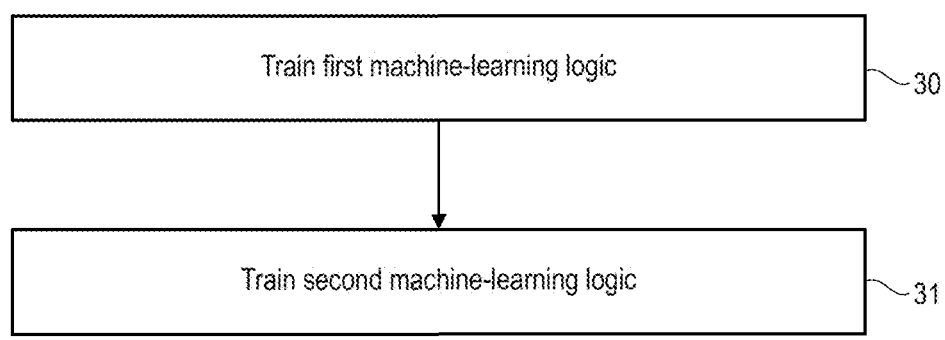
FIG. 3 is a flowchart illustrating a method according to a further embodiment.

The first and second machine learning logics can be trained beforehand. A corresponding method is shown in FIG. 3. The method of FIG. 3 will be further explained referring to FIGS. 11A to 11E.

At 30, the method of FIG. 3 includes training the first machine learning logic used at 20 in FIG. 2. For this, training sets can be provided, for example 3D data sets obtained by measurement device 11 where the target objects are for example manually annotated, i.e. identified, or annotated by other techniques like image recognition techniques not using a machine learning logic.

Figure 11A:
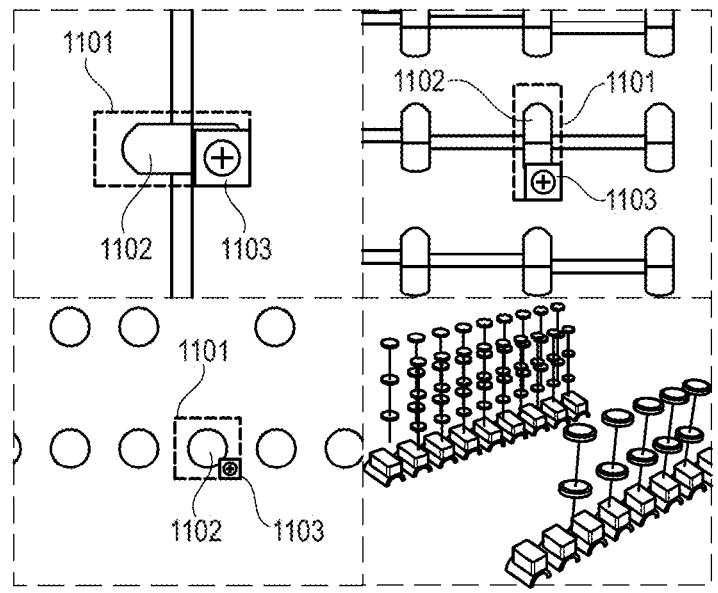
FIGS. 11A to 11E show examples for illustrating the method of FIG. 3.
Figure 11B:
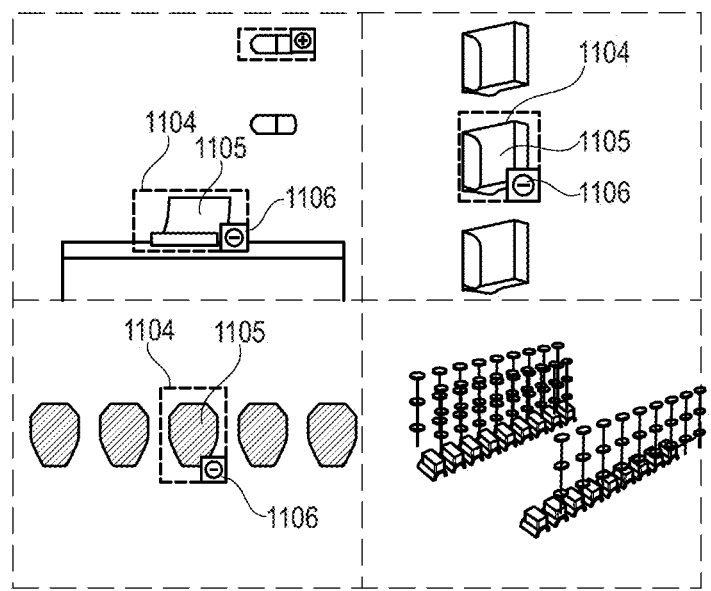

As an illustrative, non-limiting example, FIGS. 11A and 11B show various views of example objects of a chip on chip interconnect structure. A target object 1102, shown from different perspectives, is annotated manually by a bounding box 1101 in a graphical user interface (GUI) and marked by a marker 1103 (symbolized by a "+") as a target object. Furthermore, negative annotations can be used, as shown in FIG. 11B. Here, an object 1105, which is not a target object to be analyzed, is marked by a bounding box 1104 and marked with a marker 1106 (symbolized by a "−") as a non-target object. Positive annotations of target objects as in FIG. 11A can increase the true positive rate of the trained first machine learning logic, i.e. the amount of target objects successfully detected. Negative annotations of non-target objects as in FIG. 11B can decrease the false positive rate of the trained first machine learning logic, i.e. the amount of non-target objects identified as target objects.

Figure 11C:
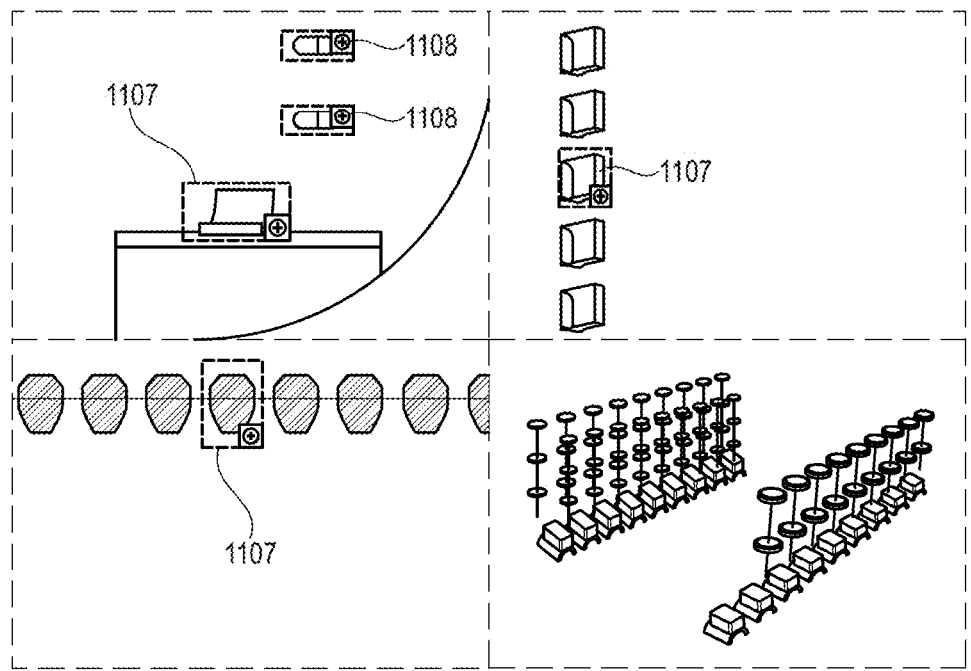

These annotated objects are then used to train the first machine-learning logic. The trained machine learning logic can then be used to process a 3D training data volume. FIG. 11C shows an example result, where target objects 1108 and non-target objects 1107 have been identified by the trained first machine-learning logic. To improve the object detection by the first machine learning logic, a human operator may correct these identifications if necessary (e.g., mark wrongly detected target objects with marker 1106 and mark not detected target objects with marker 1103 explained with reference to FIGS. 11A and 11B) and retrain the first machine-learning logic based on these corrections.

After training the first machine learning logic, at 31, the method of FIG. 3 includes training the second machine learning logic. Here, the annotated 3D data sets used for training the machine learning logic can be further annotated in that the different voxels are identified and classified for example manually. In other embodiments, a separate training set can be used. For this, after 30, 3D data sets can be processed with the first machine learning logic as at 20 in FIG. 2, and then the detected target objects may be manually annotated to classify the voxels. In both cases, the data with annotated classified voxels can then be used for training the second machine learning logic.

Figure 11D:
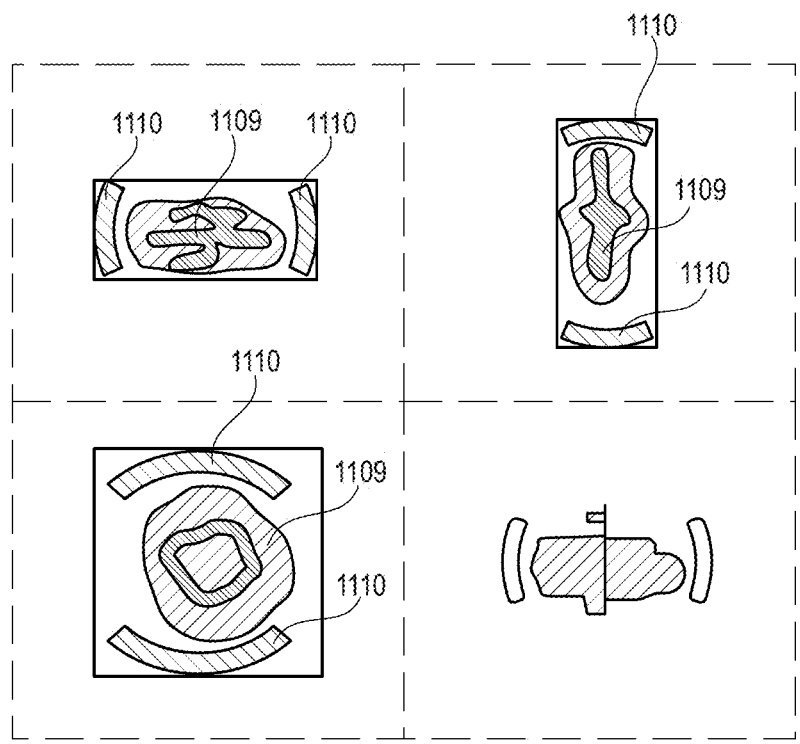
Figure 11E:
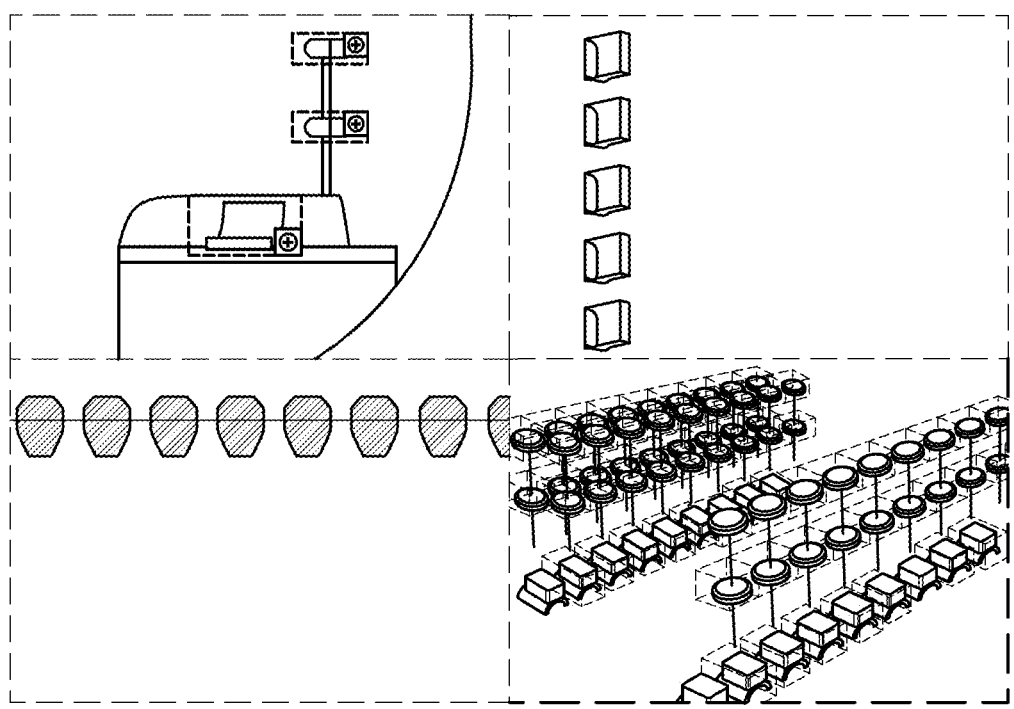

As a non-limiting example, as shown in FIG. 11D, a subset of the target objects identified by the trained first machine-learning logic as illustrated in FIG. 11C can be further annotated. In the example of FIG. 11D, a background 1110 and solder material 1109 is annotated. Other materials (e.g., tungsten) may be annotated as well. Then, the second machine-learning logic is trained based on these annotations. FIG. 11E shows an example result of applying the trained second machine-learning logic to training data. As for the first machine-learning logic, corrections can be made and re-training can be performed.

Once the training is completed, the thus trained first and second machine-learning logic are ready to be used.

Returning now to FIG. 2, the method continues with applying a transformation to the classified voxels. The transformation can transform the classified voxel to a feature space, for example linear feature space, to provide functions of features of the target objects like cross-sectional area profile along a direction thereof, derivative thereof, or other dimensions of the target objects. An example for such a transformation is described in Kanyiri, C. W., Kinyanjui, M. & Giterere, K., "Analysis of flow parameters of a Newtonian fluid through a cylindrical collapsible tube," SpringerPlus 3, 566 (2014).

Finally, from the transformations at 23 measurement results, for example of the target objects or information regarding faults of the target objects can be obtained.

Figure 4:
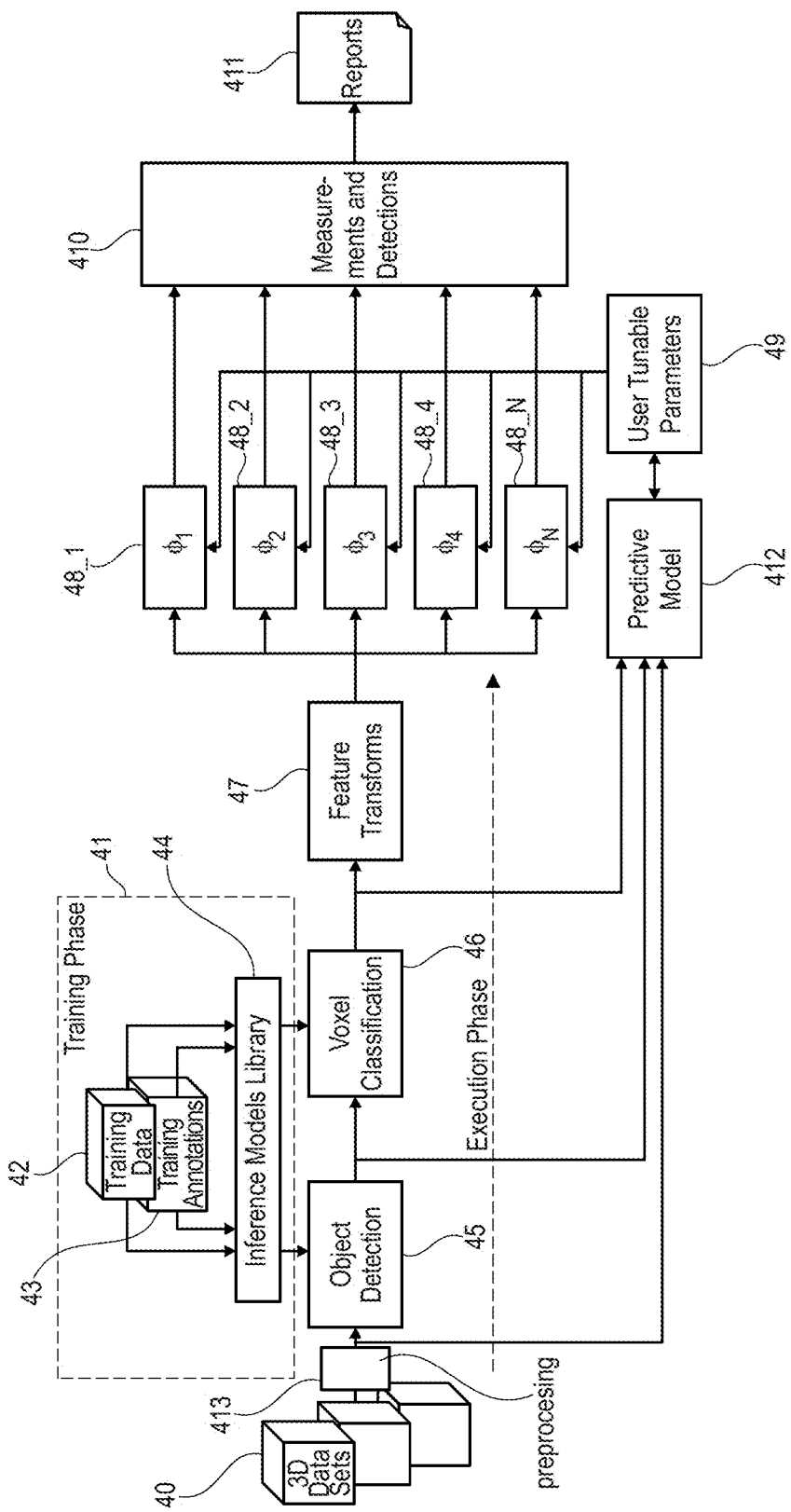
FIG. 4 is a diagram illustrating a method according to an embodiment.

FIG. 4 is a diagram illustrating an example workflow for analyzing 3D data sets 40, which can for example be obtained by measurement device 11 of FIG. 1 for a device under inspection. The workflow of FIG. 4 is an implementation example of the methods of FIGS. 2 and 3. The various blocks as shown in FIG. 4 can be implemented as software components on evaluation device 12. In some embodiments, with the workflow of FIG. 4 a solution with high throughput and functionality combined with a comparatively low training effort can be obtained.

The workflow of FIG. 4 will be further explained referring to FIGS. 5 to 10 using interconnects between chips as an example for target objects, similar to FIGS. 11A-11E above. It is to be understood that this is only for illustration purposes, and in other embodiments other objects may be used.

Figure 5:
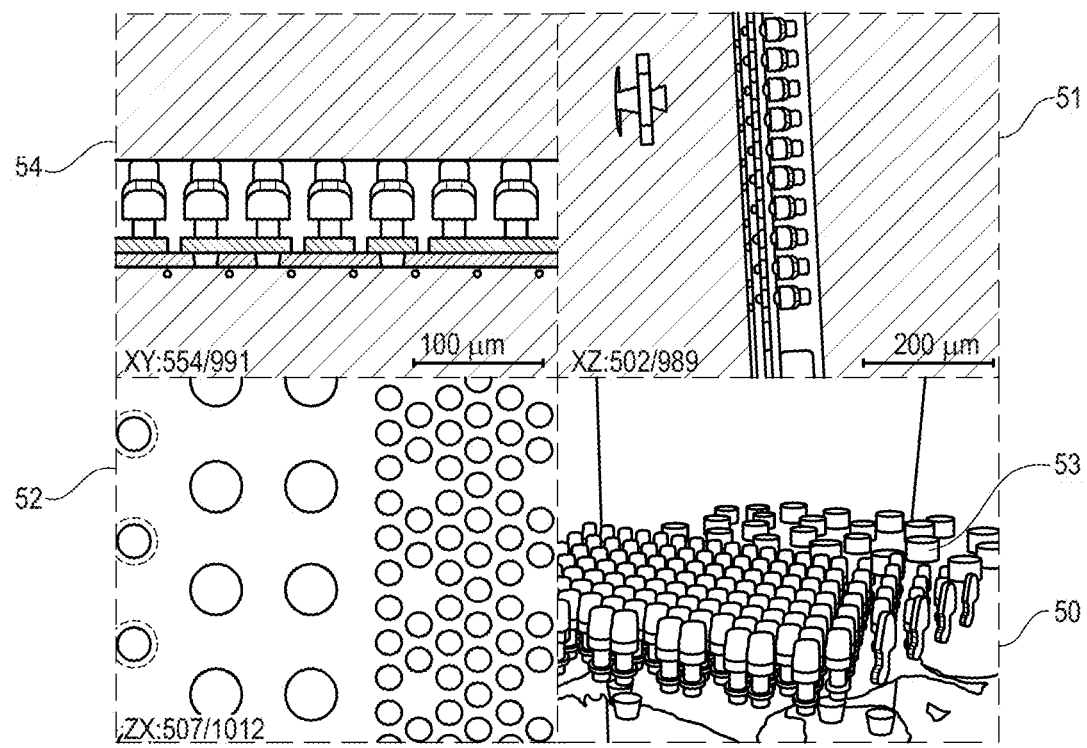
FIGS. 5 to 8 show example structures for illustrating embodiments.

FIG. 5, as an example for 3D data sets 40, shows a 3D rendering of an integrated circuit package sample in an image part 50 with a plurality of interconnects 53 between chip dies. An image part 52 shows a top view of the interconnects, and image parts 51 and 54 show cross sectional views thereof. Interconnects 53, as mentioned above, here serves as target objects to be analyzed. As can be seen, a chirp may comprise a high number of such interconnects as three-dimensional structures, making an automated analysis and evaluation of these structures desirable. In the example of FIG. 5, the 3D data was obtained by computer tomography microscopy.

In some embodiments, the 3D data set can be first subjected to conventional computer vision preprocessing 413 like filtering, noise reduction or sharpening.

The 3D data 40 is subjected to object detection 45 by a first machine learning logic. The first machine learning logic can be a random hough forest 3D object detector. In a training phase indicated by a box 41 (see also explanations to FIGS. 3 and 11A-11E), training data 42 is provided with training annotations 43 to provide an inference model library 44 for training the first machine learning logic and also the second machine learning logic mentioned below. During the actual analysis, the object detection 45 can provide object detection for the target structures like interconnects it was trained for.

Figure 6:
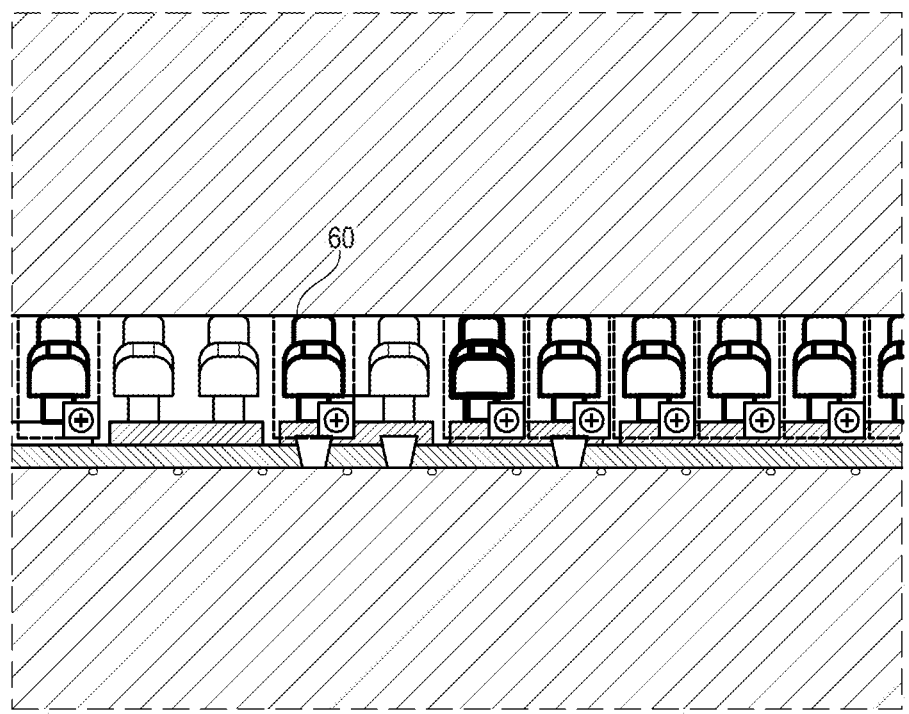

FIG. 6 shows an example for the result of such an object detection, where target interconnects 60 are marked with a "+" signs and have boxes surrounding them, which mark the identified regions with the target objects. In the 3D case, the boxes can be three-dimensional boxes, and the two-dimensional representation of FIG. 6 is only for illustration purposes, see also the explanations for FIGS. 11A and 11B above.

Next, returning to FIG. 4, at 46 a voxel classification is performed by a second machine learning logic. Here, different voxels are attributed to different materials, for example, in case of interconnects, copper, solder material, tungsten or surrounding dielectric material. The training of the second machine learning logic (31 in FIG. 3) can again be performed based on the inference model library 44 obtained by annotating training data, as explained with reference to FIG. 3.

Figure 7:
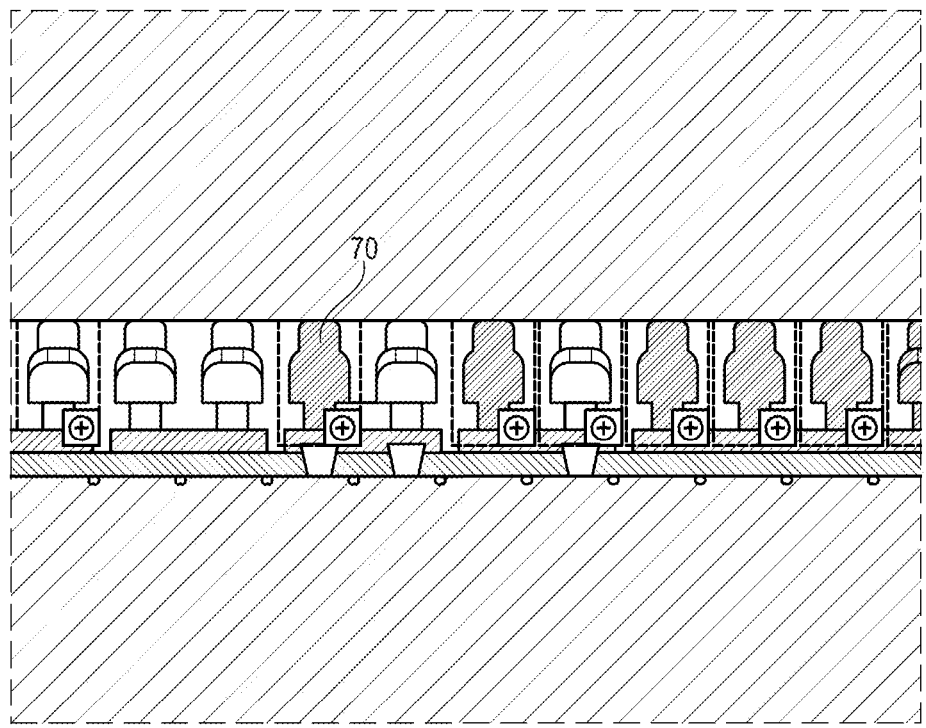

Classifying voxels may also be referred to as segmentation, and single class segmentation (simply separating the actual interconnect material from the surrounding material in the example) or multi class segmentation (distinguishing different materials in the example of interconnects) can be used. FIG. 7 illustrates an example where some of the interconnects identified in FIG. 6 have been subjected to segmentation, such that the exact contours of the interconnect material in voxel space (i.e. voxels for example belonging to solder and voxels separated from voxels corresponding to surrounding material) are visible.

Next, at 47 in FIG. 4, the classified voxels are transformed to feature space, for example linear feature space. In other words, properties of the target objects are determined as functions depending on a linear parameter. Other non-linear or multi-variate transformations can be used as well. It should be noted that a single feature transform or also multiple feature transforms can be performed.

The following are examples of various transforms that could be performed on classified voxel data volume: (1) count of voxel whose values lie between a specified range, (2) object volumes based on values between a specified range, (3) object bounding box dimensions, (4) object centroids, and (5) object major/minor axes.

Figure 8:
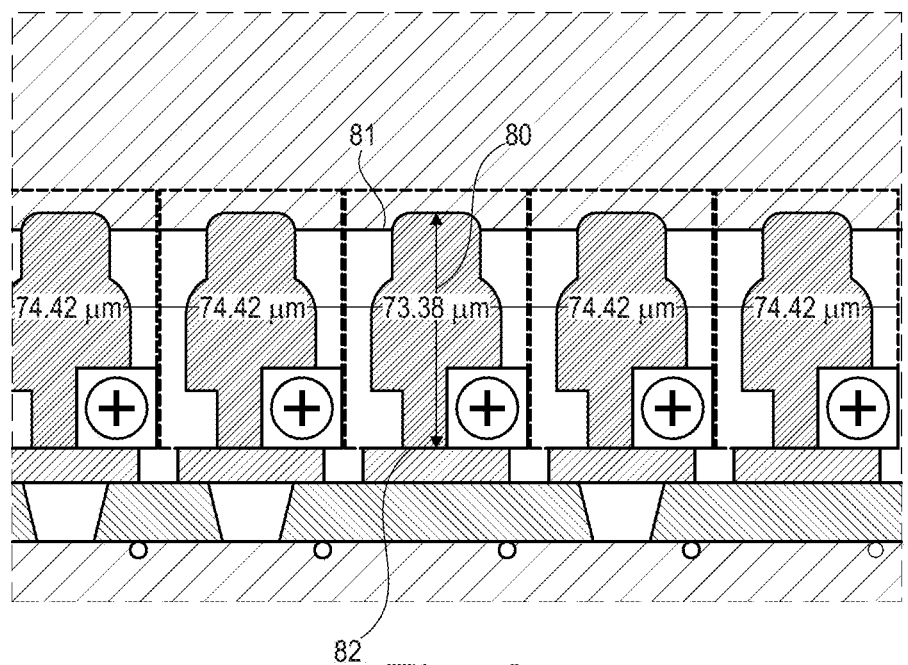

In the embodiment shown in FIG. 8, the sub-volumes containing detected objects are transformed onto a centroid line along the principal axes of each object (denoted by transform T). At each point along the central axis, a cross-sectional area orthogonal to the axis is computed, thereby transforming each detected object ($O_n$) into an area ($A_c$) parameterized by the linear position (s) along the central axis:

T: $O_n \rightarrow A_c(s)$, where s represents the linear distance from the origin of the central axis This transform can be computed by extracting the bounding contours of the binarized thresholded image object within a sequence of cross-sectional images. Similar transforms for biomechanical modeling have described in Mahmoudi, Moeinoddin, Dorali, Mohammad Reza & Beni, Mohsen, Mahbadi, Hossein, ISME 2018, "Bio-CAD modeling of femoral bones with Dual X-ray absorptiometry and Spiral CT-scan technique." These contours can be obtained using a standard contour detection algorithm as described in Bradski, G., Kaehler, A. (2008), "Learning OpenCV: Computer vision with the OpenCV library," O'Reilly Media, Inc., pp. 144-189. The central axis of the object can be determined by computing the centroids of each cross-sectional binarized image and obtaining the best fit line through all the centroids. Other standard transformations can also be found in Bradski, G., Kaehler, A. (2008), "Learning OpenCV: Computer vision with the OpenCV library."

Several functions 48_1 to 48_N of FIG. 4, also labeled $\Phi_1$ to $\Phi_N$ can be produced as a result of the feature transforms. As an example, as indicated by arrows 80, cross-sectional area profile along the height of each isolated interconnect can be calculated as a function of the height (or depth), and a derivative of the cross-sectional area as a function of height can be calculated. Other examples for functions 48 include diameter or also further derivatives (second derivative, third derivative, etc.) The functions can include user tunable parameters 49. For example, the user tunable parameters can include quantities for the functions, i.e. quantities that modify the way that objects are measured (like diameter, area, height, etc.). These can include parameters such as threshold values for edge detection or image binarization, weights for Laplacian and Gaussian filtering operations, and radii for morphological operators such as erosion and dilation, to mention a few. Some examples can also be found in Bradski, G. and Kaehler, A. cited above.

Based on the selections made by the user for user tunable parameters 49, in some embodiments an optional predictive model 412 can be used to predict which parameters a user will likely use and set them in advance, so the required input by the user is reduced.

Figure 12:
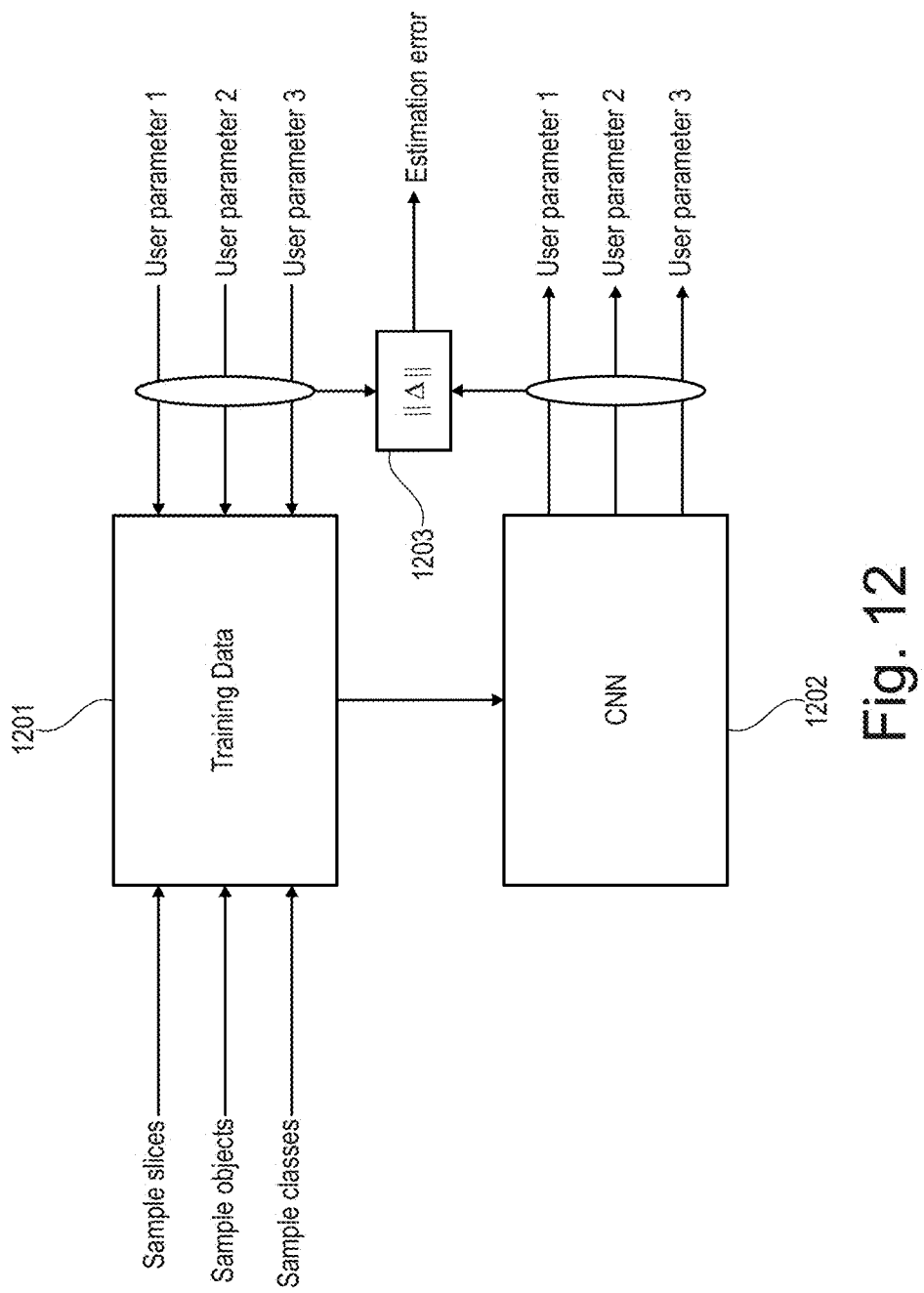
FIG. 12 is an implementation example of a predictive model according to some embodiments.

Predictive model 412 in embodiments constructs a cumulative training dataset that can comprise, but is not limited to, sample dataset images, sample object detections, and sample voxel classes along with user specified control parameters such as trace selections, edge count selections, edge thresholds, etc. FIG. 12 illustrates an example implementation of predictive model 412. For each new dataset that is processed by the end user in the workflow (e.g., sample slices, classes or objects for which the end user determines user parameters), this dataset can be used as a training dataset 1201 for a machine learning model such as a convolution neural network (CNN) 1202, that can be trained to predict the values of the user specified control parameters, i.e. training such that an estimation error 1203 is minimized.

The CNN then predicts (or estimates) the control parameters based solely on the sample inputs and these predictions are compared against the user specified control parameters. Once the estimation error consistently falls below a predefined threshold (for example, less than 5%), the predicted values can then be presented to the user as recommended settings for the control parameters. The behavior of the predictive model is thus very similar to a standard machine learning based recommender system as described in Aggarwal C. C. (2016), "An Introduction to Recommender Systems," Recommender Systems, Springer, Cham. https://doi.org/10.1007/978-3-319-29659-3_1.

Figure 9:
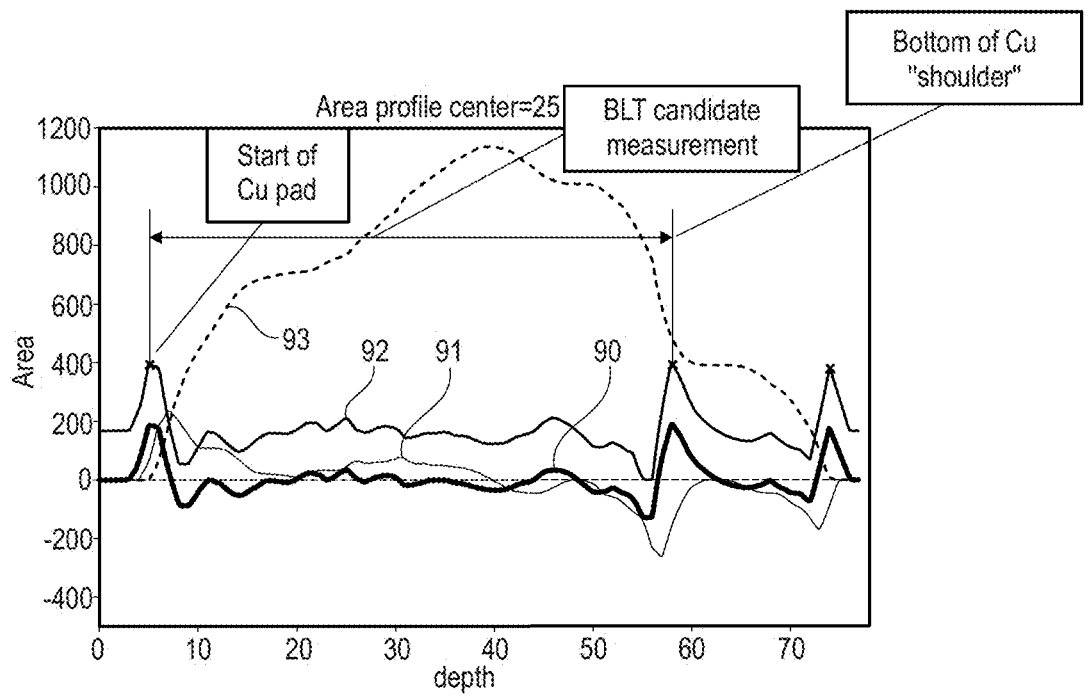
FIGS. 9 and 10 illustrate measurement results for example structures for further illustration.

From these functions 48, at 410 measurements and detections of fault conditions can be performed. The results can be output as reports 411, e.g., in data files, can be displayed graphically on a display, or both. For example, FIG. 9 shows an example for an interconnect from a start of a copper (Cu) pad 82 to a bottom of a copper shoulder 81 shown in FIG. 8 and beyond.

A curve 93 shows the cross-sectional area, and curves 90 to 92 show derivatives. "BLT candidate measurement" indicates a distance from the start of the copper pad to the bottom of the copper shoulder.

Figure 10:
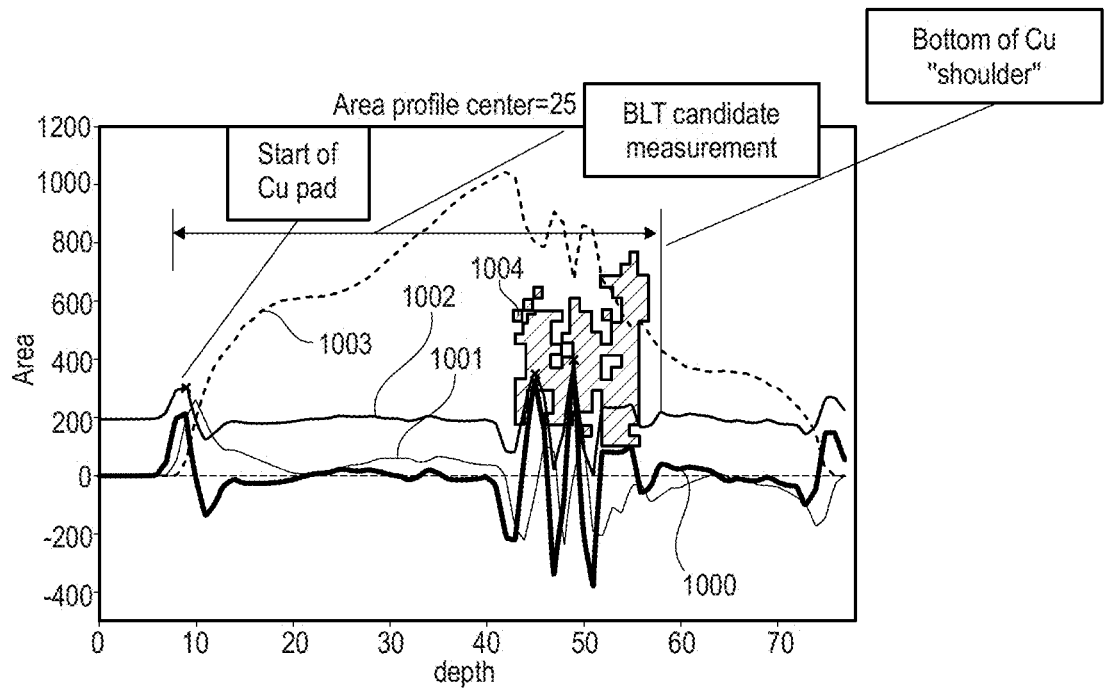

FIG. 10 shows a corresponding measurement where a void 1004 is present in the interconnect. As can be seen, the presence of the void is clearly visible in curves 1000 to 1003, showing the same quantities as curves 90 to 93, respectively. Therefore, by analyzing the curves defects like voids can be found. For example, the curves resulting of the measurement functions can be compared to nominal curves or curves obtained from fault free interconnects, and deviations above some threshold can be indicative of an error.

Therefore, with the approach illustrated, even high volumes of data, for example a plurality of interconnects, can be efficiently measured.

Some embodiments are defined by the following examples:

Example 1. A method for evaluating 3D data of a device under inspection, comprising:
  detecting target objects in the 3D data using a first machine learning logic,
  applying a voxel classification to the detected target objects using a second machine learning logic to provide a segmentation of voxels depending on a material of the device the respective voxel represents,
  applying a transformation to feature space to the classified voxels, and
  obtaining measurement results based on the transformation to feature space.

Example 2. The method of example 1, wherein the device is a semiconductor device.

Example 3. The method of example 2, wherein the target objects are interconnects between chip dies.

Example 4. The method of any one of examples 1 to 3, wherein the first machine learning logic comprises a hough forest model.

Example 5. The method of any one of examples 1 to 4, wherein the second machine learning logic comprises a 3D random forest segmentation model.

Example 6. The method of any one of examples 1 to 5, wherein the transformation to feature space includes a transformation to linear feature space.

Example 7. The method of any one of examples 1 to 6, wherein the transformation to feature space comprises providing one or more functions describing a dependency of a first dimensional variable to a second dimensional variable, or derivatives thereof.

Example 8. The method of example 7, wherein the first dimensional variable includes an area or a diameter.

Example 9. The method of examples 7 or 8, wherein the second dimensional variable includes a position variable.

Example 10. The method of any one of examples 7 to 9, wherein obtaining measurements includes identifying deviations of the functions from nominal functions.

Example 11. The method of any one of examples 7 to 10, wherein the one or more functions are user configurable.

Example 12. The method of example 11, furthermore comprising predicting a desired user configuration.

Example 13. An evaluation device for evaluating 3D data of a device under inspection, comprising one or more processors configured to:
  detect target objects in the 3D data using a first machine learning logic,
  apply a voxel classification to the detected target objects using a second machine learning logic to provide a segmentation of voxels depending on material of the device the respective voxel represents,
  apply a transformation to feature space to the classified voxels, and
  obtain measurement results based on the transformation to feature space.

Example 14. The evaluation device of example 13, wherein the device under inspection is a semiconductor device.

Example 15. The evaluation device of example 14, wherein the target objects are interconnects between chips.

Example 16. The evaluation device of any one of examples 13 to 15, wherein the first machine learning logic comprises a hough forest model.

Example 17. The evaluation device of any one of examples 13 to 16, wherein the second machine learning logic comprises a 3D random forest segmentation model.

Example 18. The evaluation device of any one of examples 13 to 17, wherein the transformation to feature space includes a transformation to linear feature space.

Example 19. The evaluation device of any one of examples 13 to 18, wherein for the transformation to feature space the one or more processors are configured to provide one or more functions describing a dependency of a first dimensional variable to a second dimensional variable, or derivatives thereof.

Example 20. The evaluation device of example 19, wherein the first dimensional variable includes an area or a diameter.

Example 21. The evaluation device of examples 19 or 20, wherein the second dimensional variable includes a position variable.

Example 22. The evaluation device of any one of examples 19 to 21, wherein for obtaining measurements the one or more processors are configured to identify deviations of the functions from nominal functions.

Example 23. The evaluation device of any one of examples 19 to 22, wherein the one or more functions are user configurable.

Example 24. The evaluation device of example 23, furthermore comprising a predictive model configured to predict a desired user configuration.

Example 25. A system, comprising:
a measurement device configured to obtain 3D data of a device under test, and
the evaluation device of any one of examples 13 to 24.

Example 26. A method for training the evaluation device of any one of examples 13 to 25, comprising:
training the first machine learning logic based on training data with annotated target objects, and
training the second machine learning logic with training data including annotated voxels.

Example 27. A computer program including a program code which, when executed on a processor, causes execution of the method of any one of examples 1 to 12.

Example 28. A tangible non-transitory storage medium having the computer program of example 27 stored thereon.

These examples are not to be construed as limiting.

What is claimed is:

1. A method for evaluating 3D data of a device under inspection, comprising:
    detecting target objects in the 3D data using a first machine learning logic,
    applying a voxel classification to the detected target objects using a second machine learning logic to provide classified voxels that represent a segmentation of voxels depending on a material of the device the respective voxel represents,
    applying a transformation to feature space to the classified voxels, and
    obtaining measurement results based on the transformation to feature space.

2. The method of claim 1, wherein the device is a semiconductor device.

3. The method of claim 2, wherein the target objects are interconnects between chip dies.

4. The method of claim 1, wherein the first machine learning logic comprises a hough forest model.

5. The method of claim 1, wherein the second machine learning logic comprises a 3D random forest segmentation model.

6. The method of claim 1, wherein the transformation to feature space includes a transformation to linear feature space.

7. The method of claim 1, wherein the transformation to feature space comprises providing one or more functions describing a dependency of a first dimensional variable to a second dimensional variable, or derivatives thereof.

8. The method of claim 7, wherein the first dimensional variable includes an area or a diameter.

9. The method of claim 7, wherein the second dimensional variable includes a position variable.

10. The method of claim 7, wherein obtaining measurements includes identifying deviations of the functions from nominal functions.

11. The method of claim 7, wherein the one or more functions are user configurable.

12. The method of claim 11, furthermore comprising predicting a desired user configuration.

13. An evaluation device for evaluating 3D data of a device under inspection, comprising one or more processors and a non-transitory machine-readable medium storing instructions that when executed by the one or more processors cause the one or more processors to:
    detect target objects in the 3D data using a first machine learning logic,
    apply a voxel classification to the detected target objects using a second machine learning logic to provide classified voxels that represent a segmentation of voxels depending on material of the device the respective voxel represents,
    apply a transformation to feature space to the classified voxels, and
    obtain measurement results based on the transformation to feature space.

14. The evaluation device of claim 13, wherein the evaluation device is configured to perform a method for evaluating the 3D data of the device under inspection, the method comprising:
    detecting the target objects in the 3D data using the first machine learning logic,
    applying the voxel classification to the detected target objects using the second machine learning logic to provide the classified voxels that represent the segmentation of voxels depending on the material of the device the respective voxel represents,
    applying the transformation to feature space to the classified voxels, and
    obtaining the measurement results based on the transformation to feature space.

15. The evaluation device of claim 13, wherein the first machine learning logic comprises a hough forest model.

16. The evaluation device of claim 13, wherein the second machine learning logic comprises a 3D random forest segmentation model.

17. A method for training the evaluation device of claim 13, comprising:
    training the first machine learning logic based on training data with annotated target objects, and
    training the second machine learning logic with training data including annotated voxels.

18. A system, comprising:
    a measurement device configured to obtain 3D data of a device under test, and
    the evaluation device of claim 13.

19. A tangible non-transitory storage medium storing a computer program including a program code which, when executed on one or more processors, causes execution of the method of claim 1.

20. The tangible non-transitory storage medium of claim 19, wherein the device is a semiconductor device.

* * * * *

UNITED STATES PATENT AND TRADEMARK OFFICE
CERTIFICATE OF CORRECTION

| | | |
|---|---|---|
| PATENT NO. | : 12,148,139 B2 | Page 1 of 1 |
| APPLICATION NO. | : 17/536662 | |
| DATED | : November 19, 2024 | |
| INVENTOR(S) | : Ramani Pichumani et al. | |

It is certified that error appears in the above-identified patent and that said Letters Patent is hereby corrected as shown below:

On the Title Page

In the illustrative print figure, text of block 413 at left portion of figure, delete "preprocesing" and insert -- preprocessing --

Page 2
Column 1 (Item (56) Other Publications), Line 22, delete "Springe-Verlag" and insert -- Springer-Verlag --

In the Drawings

Fig. 4
Text of block 413 at left portion of figure, delete "preprocesing" and insert -- preprocessing --

Signed and Sealed this
Eleventh Day of March, 2025

Coke Morgan Stewart
*Acting Director of the United States Patent and Trademark Office*